(12) United States Patent
Piepenbrock et al.

(10) Patent No.: US 8,771,567 B2
(45) Date of Patent: Jul. 8, 2014

(54) PROCESS FOR PRODUCING FIBRE PREFORMS

(75) Inventors: Joachim Piepenbrock, Buxtehude (DE); Carsten Barlag, Jever (DE); Pierre Zahlen, Stade (DE); Bernd Wohlmann, Düsseldorf (DE); Markus Schneider, Düsseldorf (DE)

(73) Assignees: Airbus Operations GmbH, Hamburg (DE); Toho Tenax Europe GmbH, Wuppertal (DE)

( * ) Notice: Subject to any disclaimer, the term of this patent is extended or adjusted under 35 U.S.C. 154(b) by 120 days.

(21) Appl. No.: 12/903,867

(22) Filed: Oct. 13, 2010

(65) Prior Publication Data

US 2011/0148007 A1 Jun. 23, 2011

Related U.S. Application Data

(63) Continuation of application No. PCT/EP2009/051802, filed on Feb. 16, 2009.

(60) Provisional application No. 61/124,313, filed on Apr. 16, 2008.

(30) Foreign Application Priority Data

Apr. 16, 2008 (DE) .......................... 10 2008 019 147

(51) Int. Cl.
*B32B 37/00* (2006.01)

(52) U.S. Cl.
USPC .......................................... 264/152; 156/297

(58) Field of Classification Search
USPC .......................................... 156/297; 264/152
See application file for complete search history.

(56) References Cited

U.S. PATENT DOCUMENTS

| 2,105,955 | A |   | 2/1974  | Goerden et al. |
| 4,699,683 | A | * | 10/1987 | McCowin ..................... 156/353 |

(Continued)

FOREIGN PATENT DOCUMENTS

| DE | 2105955  | 8/1972 |
| DE | 69122064 | 4/1997 |

(Continued)

OTHER PUBLICATIONS

German Office Action for DE 10 2008 019 147.7 dated Nov. 18, 2008.

(Continued)

*Primary Examiner* — Galen Hauth
(74) *Attorney, Agent, or Firm* — Jenkins, Wilson, Taylor & Hunt, P.A.

(57) ABSTRACT

A process for producing fiber preforms for composite material components makes it possible to directly produce complex geometries in a flexible and low-cost manner by applying a plurality of dry fiber rovings independently of one another even in spatially uneven contours. It is no longer necessary to use cut fabric strips since fiber preforms are produced straight from the dry fiber rovings. This obviates the need to carry out production, transport and order picking processes. It is not necessary to cut fiber strips to size, and therefore a saving may be made on material. In addition, it is possible to increase the mechanical characteristic values in the composite material because it is not necessary to sew fiber webs. The described process can also readily be scaled since the number of dry fiber rovings arranged next to one another make it possible to vary the area which can be covered.

22 Claims, 1 Drawing Sheet

(56) References Cited

U.S. PATENT DOCUMENTS

| | | |
|---|---|---|
| 4,952,366 A | 8/1990 | Gelin |
| 5,394,906 A | 3/1995 | Farley |
| 5,454,897 A | 10/1995 | Vaniglia |
| 5,562,788 A | 10/1996 | Kitson et al. |
| 5,698,066 A | 12/1997 | Johnson et al. |
| 6,048,488 A * | 4/2000 | Fink et al. .................... 264/510 |
| 2007/0023139 A1 | 2/2007 | Bruyere et al. |

FOREIGN PATENT DOCUMENTS

| | | |
|---|---|---|
| DE | 69500513 | 12/1997 |
| DE | 19726831 | 1/1999 |
| DE | 69812405 | 1/2004 |
| DE | 10301646 | 7/2004 |
| DE | 10 2005 034 401 | 2/2007 |
| WO | WO9922932 | 5/1999 |
| WO | WO 2007/010051 | 1/2007 |

OTHER PUBLICATIONS

International Search Report for PCT/EP2009/051802 dated Aug. 12, 2009.
German Office Action for DE 10 2008 019 147.7 dated Oct. 21, 2010.
Rudd et al., "Tow placement studies for liquid composite moulding," *Composites Part A: Applied Science and Mdanufacturing*, Elsevier Science Publishers 30:9, Sep. 1, 1999.
German Office Action for Application No. DE 10 2008 019 147.7 dated Nov. 29, 2012.

* cited by examiner

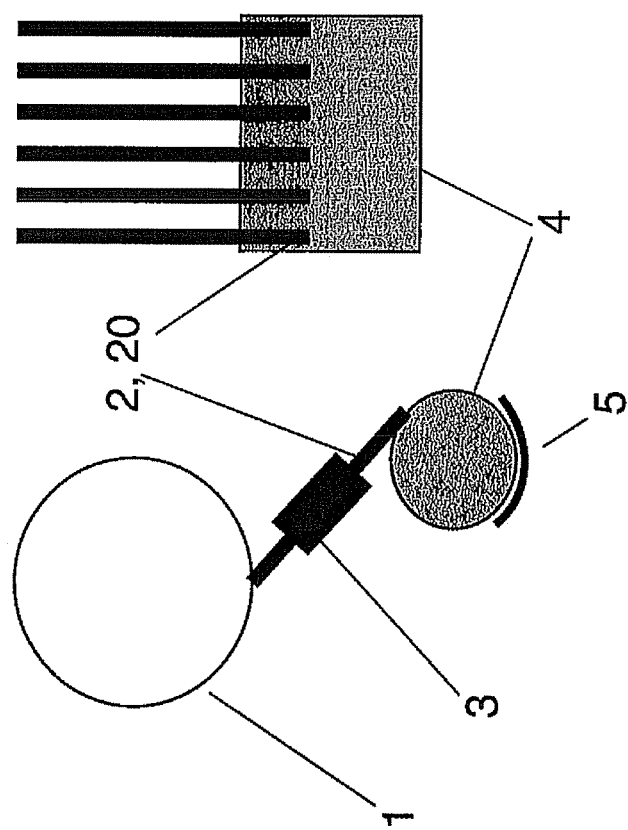

PROCESS FOR PRODUCING FIBRE PREFORMS

CROSS-REFERENCE TO RELATED APPLICATIONS

This application is a continuation of PCT/EP2009/051802 filed Feb. 16, 2009 and claims the benefit of U.S. Provisional Application No. 61/124,313, filed Apr. 16, 2008 and German Patent Application No. 10 2008 019 147.7, filed Apr. 16, 2008, the entire disclosures of which are herein incorporated by reference.

FIELD OF THE INVENTION

The present invention relates to a process for the production of fibre preforms.

In lightweight construction, particularly in aircraft construction, composite components consisting of fibre reinforced plastics materials are increasingly used which are able to withstand extreme mechanical loads and provide at the same time a great potential for reducing weight. These components are formed using reinforcing fibres which are then saturated or impregnated with a curable plastics material, for example a polyester resin, an epoxy resin or the like, to form the finished component. In so doing, the fibres are anchored in the matrix during the consolidation thereof for the production of the fibre composite.

The alignment of the reinforcing fibres in a component of this type has a decisive influence on the rigidity and strength of the component. If possible, the reinforcing fibres should follow the direction of loading and should not have any undulations in order to achieve optimal mechanical characteristics. Furthermore, it is desirable for each individual reinforcing fibre to be subjected to uniform loading.

Fibre preforms are also used which are produced by laying prefabricated fibre semi-finished products consisting of fibre bundles or dry fibre rovings, such as multiaxial fabric carpet, non-woven or woven carpets. For this purpose, the geometries are cut out of a body, for example. Not all conceivable fibre orientations are achievable with these conventional semi-finished products, because the reinforcing fibres are generally arranged therein in a specific, fixed orientation. Although fibre-woven fabrics can be "draped", laid in a planar manner without creasing, for example to form segments of a circular ring, the reinforcing fibres cannot generally be brought into line with the flow of by more complex force flux lines.

One possible means of satisfying the requirement for a fibre alignment in accordance with loading is the known TFP process. In this process, dry fibre rovings for mechanical reinforcement which, in turn, are formed using a plurality of discrete reinforcing fibres flowing parallel to one another, are laid down along any desired trajectory and are affixed by a fixing thread to a backing layer to form a fibre preform, whereby it is possible to adapt the orientation of the individual dry fibre rovings virtually optimally to the forces acting on the finished composite component. In this case, fixing is carried out by an upper fixing thread and a lower fixing thread which are interlinked underneath the backing layer, according to conventional sewing processes. The optimum utilisation of the mechanical load-bearing capacity of the dry fibre rovings achieved in this manner can minimise the number of said dry fibre rovings, and consequently also the weight. Moreover, the cross-section of the component can be adapted in an ideal manner to the respective local loads. Furthermore, reinforcements can be formed specifically in zones which are subjected to particular loading, for example regions where force is introduced or the like, by laying additional dry fibre rovings. The reinforcing fibres are formed, for example by glass fibres, carbon fibres, aramide fibres, polyester fibres or the like.

Fibre preforms can be produced by the TFP process on conventional CNC-controlled automatic sewing or embroidery machines which are also used, for example in the textile industry.

When all the required plies have been laid with dry fibre rovings, the finished fibre preform which usually already has the desired final contour, is introduced into a closable mould, is impregnated with a curable plastics material and finally cured to produce the finished composite material. A plurality of TFP fibre preforms and/or plies of reinforcing fabrics can be combined here. Multi-layered fibre preforms can be formed by placing a plurality of fibre preforms in layers one on top of the other, in such a way that greater material thicknesses can be achieved.

The fibre preforms can be impregnated with curable plastics material, for example by the known RTM ("resin transfer moulding") process, in a correspondingly configured closable mould.

DE 10 2005 034 401 B4 describes a process of this type for the production of single or multi-layered fibre preforms in the TFP process. In this case, fixing threads are used to anchor the non-woven fabric.

A disadvantage of the TFP process is that it is difficult to achieve great material thicknesses of the fibre preforms, because sewing with fixing threads becomes difficult as the material thickness increases. Furthermore, the fixing seams constitute imperfections in the fibre composite and consequently reduce the strength.

The other existing processes either have a high waste proportion of the body, a curved unidirectional laying of the fibre semi-finished product is impossible or only one single dry fibre roving can be laid and not several at the same time. Furthermore, hitherto it has been necessary to fix individual dry fibre rovings at their ends.

SUMMARY OF THE INVENTION

Therefore, the object of the present invention is to provide a process which allows a plurality of dry fibre rovings to be laid simultaneously next to one another. It should also be possible to form curved webs with the dry fibre rovings. A further object of the present invention is to allow a simultaneous feed of a plurality of dry fibre rovings independently of one another in order to reduce the time required for the production of the fibre preform. Furthermore, the fibre preform should be stable as a fibre-woven fabric and consequently it should be possible to form the fibre preform without fixing the dry fibre rovings using fixing threads or without affixing the dry fibre rovings with adhesive strips or regions of adhesive.

The object according to the invention is achieved by a process which has the features of claim 1.

The idea on which the present invention is based is that, in a process for the production of fibre preforms, in a first step a plurality of dry fibre rovings are fed simultaneously to a mould independently of one another, and in so doing at least some dry fibre rovings are fed at a different speed. The dry fibre rovings are then simultaneously laid next to one another directly on the mould or on dry fibre rovings located on the mould. Finally, the dry fibre rovings are severed.

Due to the fact that in the process according to the invention the dry fibre rovings are applied directly and wider strips of fabric are not used, there can be an improved adaptation to the desired contour. In this respect, each individual dry fibre roving can flow along a geometric contour with its own radius. For this purpose, it is advantageous that the dry fibre rovings are fed independently of one another, preferably also at a different speed, as in this manner it is possible for the fibres to flow along different radii.

Advantageous embodiments and improvements of the invention are set out in the subclaims.

Thus, in an advantageous embodiment of the invention, dry fibre rovings based on carbon fibres, aramide fibres, polyester fibres or glass fibres are fed.

The aforementioned materials have particularly favourable strength characteristics. By the process according to the invention, components based in particular on carbon and aramide fibres can be produced with a very favourable ratio of strength and rigidity to component weight.

In a further advantageous embodiment, dry fibre rovings which flow one on top of another are substantially laid at an angle of at least 25° to one another.

The advantage of laying the dry fibre rovings at an angle to one another, compared to a pure unidirectional laying, is that it is possible to produce components which are adapted more flexibly to the loading directions.

In a further preferred embodiment, the dry fibre rovings are laid one on top of another at two or more different angles to one another in the form of a multiaxial fabric.

This embodiment allows fibre composite materials to be produced which are able to effectively absorb forces introduced from corresponding directions and which have very good strength to cost ratios. The optimum lay-out in respect of the fibre angle in the various loading directions of the components allows low specific weights. The layer construction of the multiaxial fabric will preferably be biaxial, triaxial or quadriaxial.

In a further preferred embodiment, in a procedural step before being laid down, the dry fibre rovings are provided with a binder, in particular a thermoplastic binder.

The purpose of the binder is to bind the dry fibre rovings in order to produce a stable fibre preform. Said binder is preferably a pulverulent, melting binder which is applied as powder to the dry fibre rovings. Preferably, for this purpose, dry fibre rovings and more preferably the binder powder are electrostatically charged to allow an effective adhesion of the binder powder to the dry fibre rovings. Liquid binder can also preferably be sprayed, rolled or spread onto the dry fibre rovings or the dry fibre rovings can be immersed in said liquid binder. Furthermore, individual filaments which contain binder can also be incorporated into the dry fibre rovings.

In a further preferred embodiment, in the step of severing the dry fibre rovings, at least some dry fibre rovings are severed independently of one another by at least one severing unit.

In this manner, the length of the individual dry fibre rovings can be individually adjusted in order to produce an adapted fibre composite.

In a further preferred embodiment, when the dry fibre rovings are laid or after they have been laid, they are fixed by activation of the binder. Various processes can advantageously be employed for this purpose, for example contact pressure and/or thermal radiation and/or microwave radiation and/or infrared radiation and/or UV radiation and/or laser radiation and/or the introduction of inductive energy and/or contact heating.

According to a further preferred embodiment, after the dry fibre rovings have been laid or after they have been severed, a procedural step for the impregnation or infiltration of the laid dry fibre rovings with a curable plastics material is carried out.

This step anchors the fibres in the matrix during their consolidation for the production of the fibre composite. Infiltration by the plastics material can be furthered by a vacuum, in such a way that the liquid plastics material is pressed into the fibrous material by atmospheric pressure.

BRIEF DESCRIPTION OF THE DRAWINGS

In the following, the invention is described in more detail on the basis of an embodiment with reference to the accompanying FIGURE of the drawing.

The FIGURE is a schematic illustration of a basic structure of a device for implementing the process according to the invention for the production of fibre preforms, as a lateral cross section on the left-hand side and as a front view on the right-hand side.

DESCRIPTION OF EXEMPLARY EMBODIMENTS

FIG. 1 is a schematic illustration of a basic structure of a device for implementing the process according to the invention for the production of fibre preforms, as a lateral cross section on the left-hand side and as a front view on the right-hand side. According to a preferred embodiment of the invention, dry fibre rovings 2 are located on the fibre roving bobbins 1. The dry fibre rovings 2 are provided with binder 20. One or more severing units 3 are arranged downstream of the fibre roving bobbins 1 and are used to sever the dry fibre rovings 2. One or more pressure rollers 4 are arranged downstream of the severing unit 3 and are used for pressing against the dry fibre rovings 2 when they are laid on the mould 5.

The dry fibre rovings 2 are unwound from the fibre roving bobbins 1 independently of one another and are laid on the mould 5 or on previously laid dry fibre rovings 2. The pressure roller 4 compresses and heats the dry fibre rovings 2 such that they adhere to one another. It can be seen from the front view on the right-hand side that a plurality of dry fibre rovings 2 is fed simultaneously to the mould 5 and to the pressure roller 4. The individual dry fibre rovings 2 can then be severed by severing units 3. Thereafter, dry fibre rovings 2 can be laid anew, so that a fibre preform is produced in layers.

In this respect, the dry fibre rovings 2 are fed individually and independently of one another such that on the one hand they can rest flexibly against the contour of the mould 5 and on the other hand their length can also be adjusted individually. Particularly non-planar or curved moulds can thus be covered without bulges. Due to the fact that a plurality of dry fibre rovings 2 is fed simultaneously, wide surfaces can also be covered efficiently with dry fibre rovings 2. Furthermore, as a result of the layered application of dry fibre rovings, it is also possible to achieve large material thicknesses by means of a plurality of layers.

Although the present invention has presently been described on the basis of preferred embodiments, it is not restricted thereto, but can be modified in many different ways.

The process for the production of fibre preforms for composite material components according to the present invention makes it possible to directly produce complex geometries in a flexible and cost-effective manner by applying a plurality of dry fibre rovings independently of one another, even in spatially non-planar contours. It is no longer necessary to use cut fabric strips, since fibre preforms are produced directly from the dry fibre rovings. Consequently, production, transportation and order picking operations are not required. It is unnecessary to cut fibre strips to size, thereby making it possible to save material. Furthermore, the mechanical characteristic values can be increased in the composite material because it is unnecessary to sew fibre webs. Moreover, the process which has been described can be readily scaled, since the number of adjacently arranged dry fibre rovings makes it possible to vary the surface which can be covered. In addition, it is advantageous that the dry fibre rovings are fixed directly in the process.

LIST OF REFERENCE NUMERALS 1 fibre roving bobbins
2 dry fibre rovings
3 severing units
4 pressure rollers
5 mould
20 binder

The invention claimed is:

1. A process for the production of a fibre preform comprising:
   feeding of a plurality of dry fibre rovings provided with a binder to a contoured mould independently of one another, at least some dry fibre rovings being fed at a different speed;
   simultaneous laying and fixing by activation of the binder of the plurality of dry fibre rovings next to one another directly on the mould or on dry fibre rovings positioned on the contoured mould to form the fibre preform, and severing of the dry fibre rovings; and
   impregnating or infiltrating the laid dry fibre rovings of the fibre preform on the mould with a curable plastics material.

2. The process according to claim 1, wherein in the procedural step of feeding the dry fibre rovings, dry fibre rovings based on carbon, aramid, polyester or glass fibres are fed.

3. The process according to claim 1, wherein dry fibre rovings which flow one on top of another are substantially laid at an angle of at least 25° to one another.

4. The process according to claim 1, wherein the dry fibre rovings are laid one on top of another at two or more different angles to one another in the form of a multiaxial fabric.

5. The process according to claim 1, wherein in a procedural step before being laid, the dry fibre rovings are provided with a thermoplastic binder.

6. The process according to claim 1, wherein in the procedural step of severing the dry fibre rovings, at least some dry fibre rovings are severed independently of one another by at least one severing unit.

7. The process according to claim 1, wherein the binder is activated by contact pressure and/or thermal radiation and/or microwave radiation and/or infrared radiation and/or UV radiation and/or laser radiation and/or the introduction of inductive energy and/or contact heating.

8. A process for the production of a fibre composite, comprising:
   feeding of a plurality of dry fibre rovings provided with a binder to a three-dimensionally contoured mould independently of one another, at least some dry fibre rovings being fed at a different speed;
   simultaneously laying the plurality of dry fibre rovings next to one another directly on the mould or on dry fibre rovings positioned on the mould and fixing the plurality of dry fibre rovings by activation of the binder;
   severing of the dry fibre rovings; and
   impregnating or infiltrating the laid dry fibre rovings on the mould with a curable plastics material.

9. The process according to claim 8, wherein the dry fibre rovings are selected from the group consisting of carbon, aramid, polyester, or glass fibres.

10. The process according to claim 8, wherein dry fibre rovings which are laid on dry fibre rovings positioned on the mould are laid at an angle of at least 25° to one another.

11. The process according to claim 8, wherein the dry fibre rovings are laid one on top of another at two or more different angles to one another.

12. The process according to claim 8, wherein the dry fibre rovings are provided with the binder before being laid.

13. The process according to claim 8, wherein, in the step of severing the dry fibre rovings, at least some dry fibre rovings are severed independently of one another by at least one severing unit.

14. The process according to claim 8, wherein the binder is activated by contact pressure and/or thermal radiation and/or microwave radiation and/or infrared radiation and/or UV radiation and/or laser radiation and/or the introduction of inductive energy and/or contact heating.

15. A process for the production of a fibre preform comprising:
   feeding of a plurality of dry fibre rovings provided with a binder to a three-dimensionally contoured mould independently of one another, wherein at least some of the dry fibre rovings are fed at different speeds;
   simultaneously laying the plurality of dry fibre rovings next to one another directly over a three-dimensional contour of the mould and fixing the dry fibre rovings by activation of the binder, and
   severing of the fed dry fibre rovings;
   wherein the laid and fixed dry fibre rovings form the said fibre preform to be impregnated or infiltrated with a curable plastics material on the mould.

16. The process according to claim 15, wherein the dry fibre rovings are based on carbon, aramid, polyester or glass fibres.

17. The process according to claim 15, wherein dry fibre rovings which flow one on top of another are substantially laid at an angle of at least 25° to one another.

18. The process according to claim 15, wherein the dry fibre rovings are laid one on top of another at two or more different angles to one another in the form of a multiaxial fabric.

19. The process according to claim 15, wherein, before being laid, the dry fibre rovings are provided with a thermoplastic binder.

20. The process according to claim 15, wherein in severing the dry fibre rovings, at least some dry fibre rovings are severed independently of one another by at least one severing unit.

21. The process according to claim 15, wherein the binder is activated by any one or more of: contact pressure, thermal radiation, microwave radiation, infrared radiation, UV radiation, laser radiation, inductive energy, and contact heating.

22. The process according to claim 15, wherein, after the fibres have been laid and fixed to form the fibre preform, the dry fibre rovings are impregnated or infiltrated with a curable plastics material on the three-dimensionally contoured mould to form a fibre composite.

* * * * *